Feb. 24, 1953        J. LA VIA        2,629,868
RADIO ECHO DIRECTION DETERMINING APPARATUS
Filed Feb. 3, 1947        4 Sheets-Sheet 3
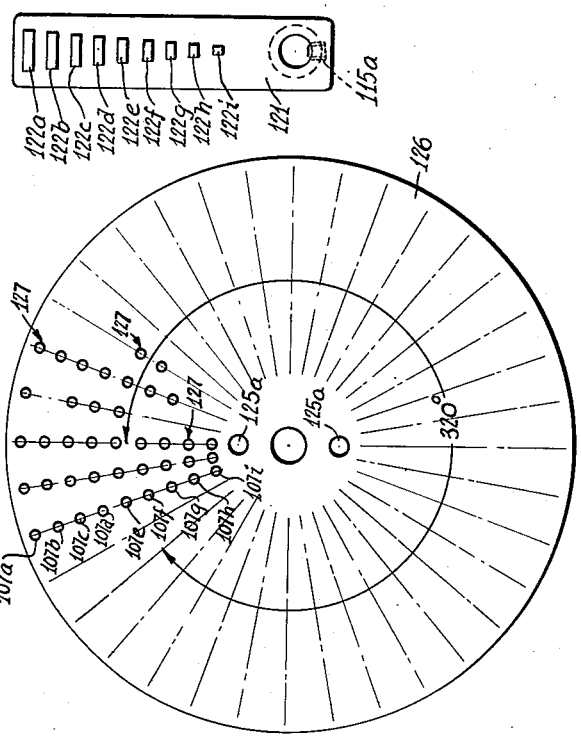
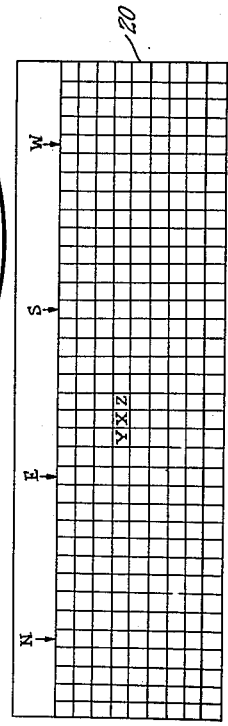
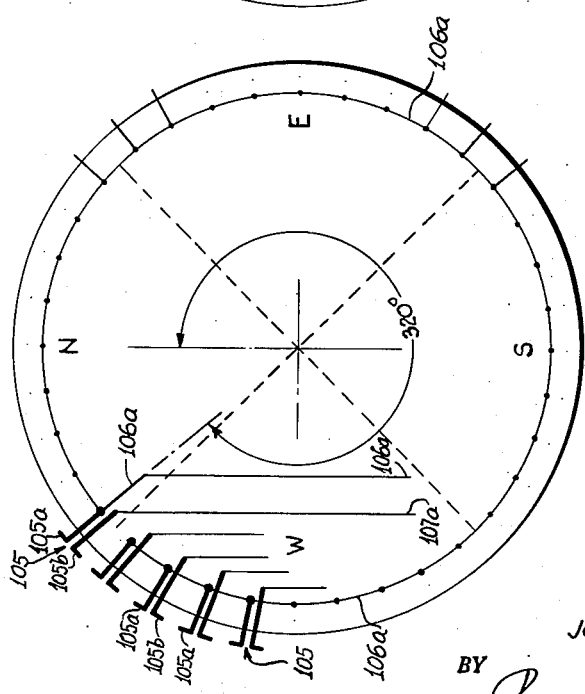
INVENTOR.
JOSEPH LA VIA.
BY
ATTORNEY.

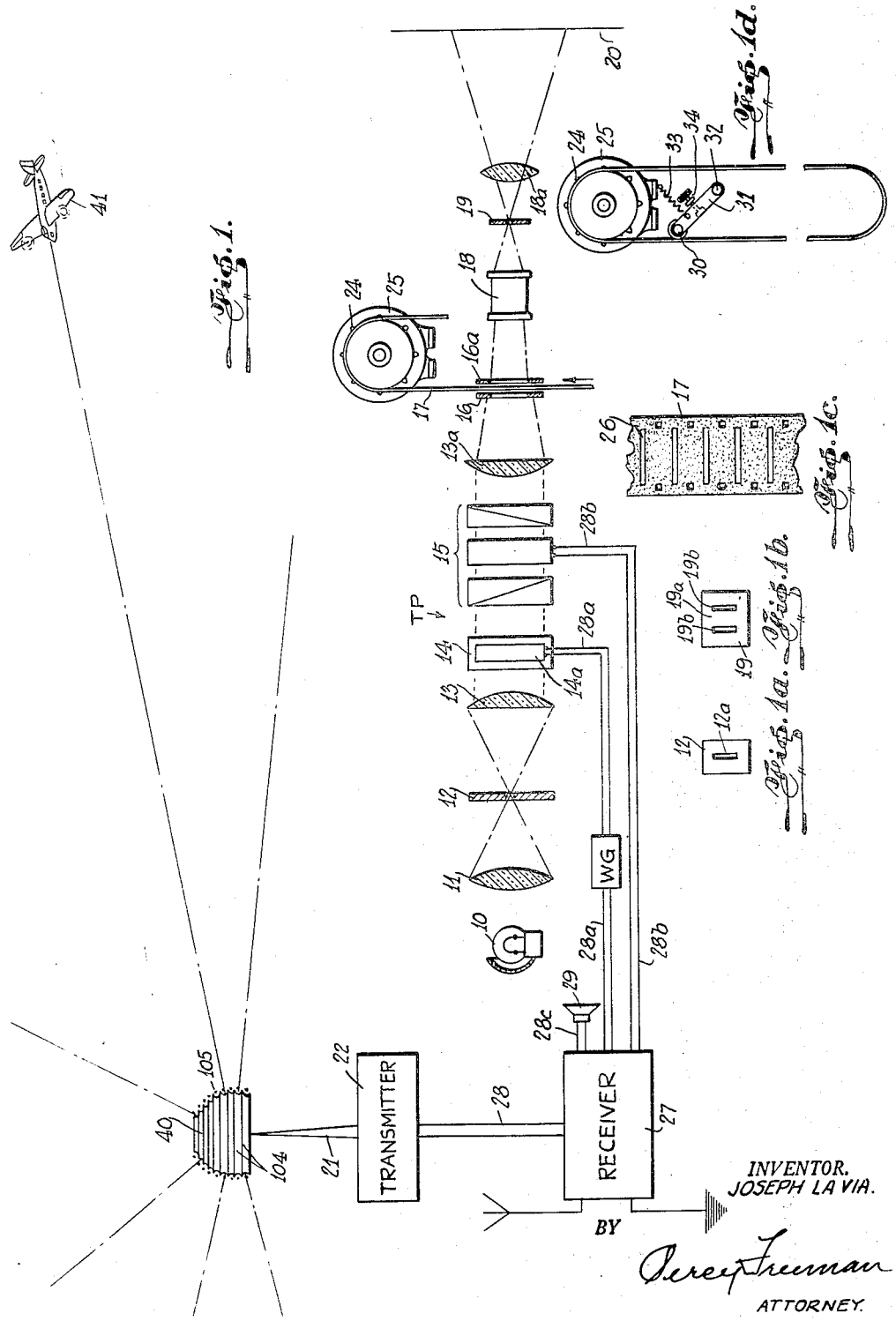

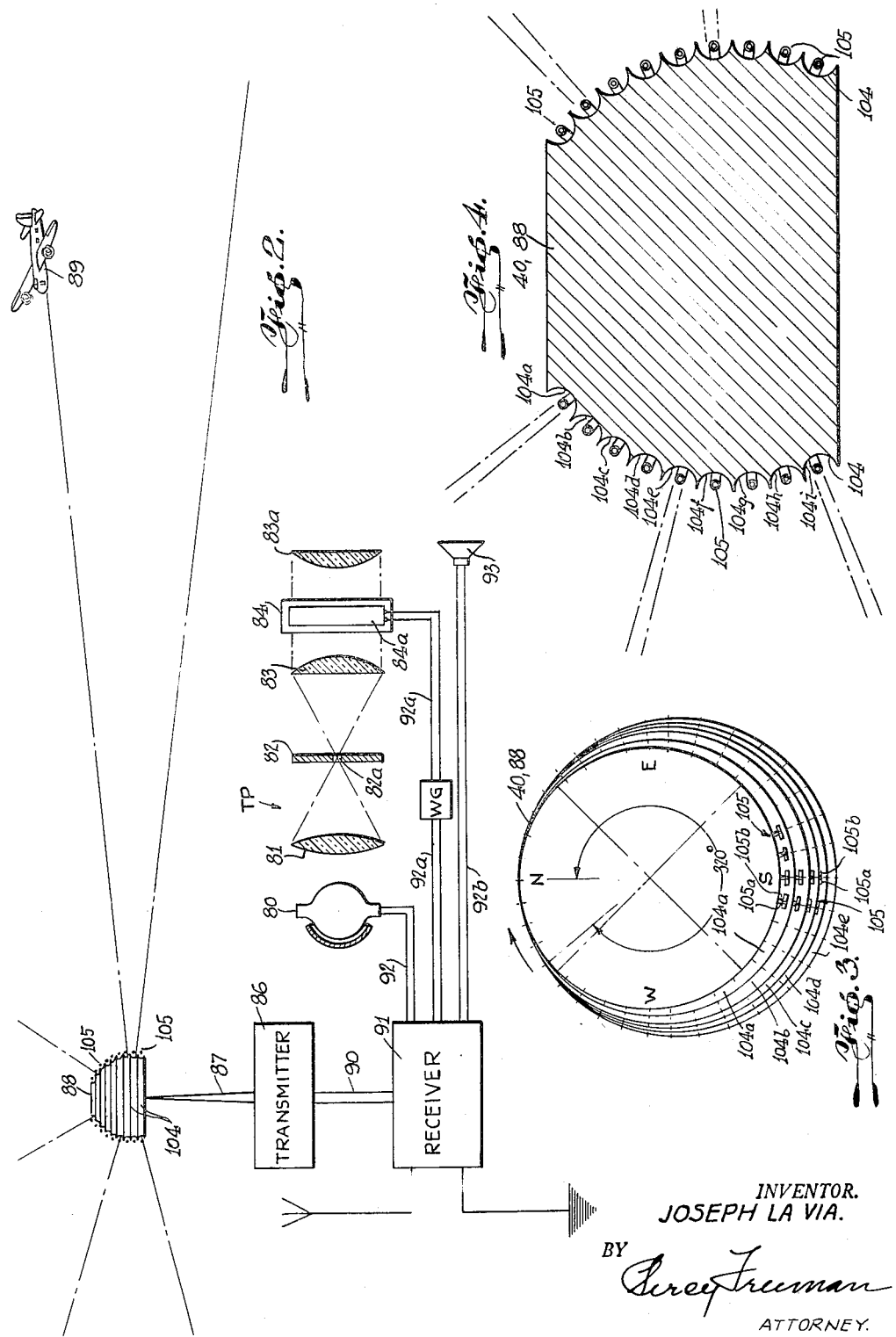

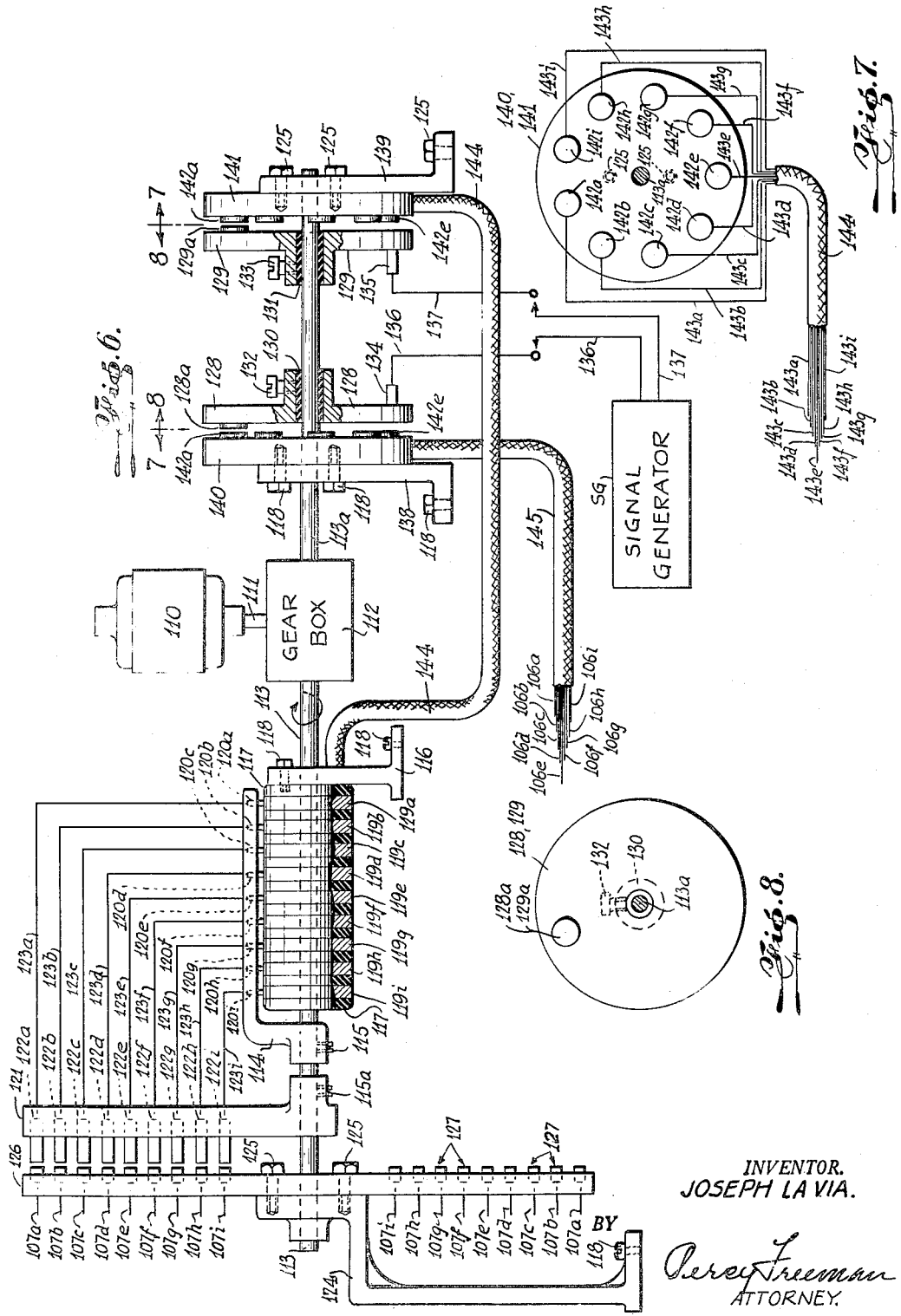

Patented Feb. 24, 1953

2,629,868

UNITED STATES PATENT OFFICE 2,629,868

RADIO ECHO DIRECTION DETERMINING APPARATUS

Joseph La Via, Ridgewood, N. Y.

Application February 3, 1947, Serial No. 725,995

6 Claims. (Cl. 343—16)

1

This invention relates to improvements in radar transmitting and receiving methods and apparatus. An object of the present invention is to provide means to scan space at a higher speed than at present utilized combined with means for exploratory projecting progressively about the vertical axis of an antenna array in a plurality of successive angular elevations or predetermined periodically retracted successive paths about the axis of the antenna and means to project onto an image screen a light component of the reflected signal so as to indicate the presence and location of a remote object and to obtain an overall or panoramic coverage of space or regions around the sending station.

Generally, the invention contemplates the use of an impulse transmitter, a high speed, fine definition space scanning antenna, a receiver, a light diffraction projector or other suitable apparatus and a viewing screen.

In the drawings:

Fig. 1 is a diagrammatic showing of method and apparatus for radar transmission and translation.

Figs. 1a, 1b, and 1c show details of the invention.

Fig. 1d is a diagrammatic view showing one form of framing device.

Fig. 2 is a diagrammatic view showing a modification of the invention shown in Fig. 1.

Fig. 3 is a top view, slightly in perspective, of an antenna array shown in Figs. 1 and 2.

Fig. 4 is a sectional view of the antenna array but drawn to an enlarged scale.

Fig. 5 is a diagrammatic view showing the arrangement of di-poles in the antenna array.

Fig. 6 is a schematic view of an energy transfer unit.

Fig. 7 is a sectional view taken on lines 7—7 of Fig. 6.

Fig. 8 is a sectional view taken on lines 8—8 of Fig. 6.

Fig. 9 is a partial front view of an energy transfer disk shown in Fig. 6.

Fig. 10 is a face view of a brush carriage shown in Fig. 6.

Fig. 11 is a diagrammatic plan view of the image screen.

Referring to the drawings in greater detail, there is shown in Fig. 1, a transmitter, a remote object, a receiver, a light diffraction projector TP and screen. In this diagram, 10 is a source of light concentrated into a beam by the condenser 11, and directed through the slit 12a (Fig. 1a) of plate 12. The emergent light rays are made parallel by lens 13, passing through a light

2 diffraction cell 14 and are blocked by a light shutter 15. This light shutter comprises a pair of Nichol prisms arranged in crossed relation with a Kerr cell interposed between them. When a suitable electro-motive force is applied to the Kerr cell, the light which is thus permitted to pass therethrough will be converged by lens 13a and pass through aperture in gate 16, aperture in plate 16a, lens 18, and an image of the light slit 12a is formed on the opaque surface 19a (Fig. 1b) of plate 19, of such size and position that practically all the light is stopped when the diffraction cell 14 is not active.

This light diffraction cell operates in accordance with the phenomenon discovered by Debye and Sears, Proceedings of the National Academy of Sciences, Washington, D. C., volume 18, pages 409–414, June 15, 1932, wherein it is disclosed that compressional waves in a liquid causes diffraction of light. There are several methods of constructing a light diffraction cell, of which the following, in brief, is one description: the consist of the cell is the combination of a suitable container, with a pair of windows in two opposite walls and at one end of the cell, a piezoelectric driver or quartz crystal is suitably mounted so that it will vibrate in response to an applied electro-motive force. The opposite end of the cell is formed at an angle of 45° and covered with a layer of cork or other resilient material to absorb the waves, so they are not reflected back to the crystal, and the cell may contain carbon tetrachloride or other suitable compressive medium. Parallel rays of light passing through the cell in a direction parallel to the wave fronts of the compressional waves in the liquid with their periodic compressions and rarefactions act similarly to a diffraction grating.

Within the confines of the cell 14 there is created a series of compressive waves, the rate of travel being one wave traversing across the cell for each energized group of di-poles hereinafter described. The light passing therethrough will become successively diffracted into vertical striations and blocked by the light shutter 15. For convenience, this diffracted light portion will hereafter be referred to as a high frequency scanning component.

Narrow slits 26 are either punched or photographically provided on the strip 17 (Fig. 1c), and 30 slits per second pass the aperture in the plate 16a. The opposite run of the band which is not exposed to the light will be directed out of the path of the light and pass by the outside of the lens 18.

Provision is made for synchronizing the position of the slits 26 with the transmitted signal and for that purpose there may be provided an idler 30 (Fig. 1d) rotatably supported on lever 31, which is pivoted at 32 to the frame or other support not shown. The lever 31 has attached to it a spring 33 which tends to urge the lever toward upright position, but a threaded nut and screw arrangement illustrated at 34, may be micrometrically adjusted to depress the lever 31, and hence the idler roller 30 against the endless band 17, to deflect it out of the vertical line, and thus to adjust the slits with relation to the aperture, to maintain synchrony between the transmitted impulses and the slits.

The motor shaft 111 (Fig. 6) is manually rotated until the brush carriage 121 is at a position of 320° (Fig. 9), and in contact with the first radial group of nine contacts 127, corresponding to the nine di-poles 105, positioned at 320°, in the antenna array 40 (Figs. 1-4). The two contacts 128a, 129a, of the discs 128, 129, are in contact with the contacts 142a, of the plates 140, 141; in this manner, a complete circuit is formed through the conductors 136, 137, and their associated elements and the electrodes 105a, 105b, of the di-pole 105, in the top group of di-poles (Figs. 3-5), positioned in association with the reflector 104a.

A slit in the band 17 is just starting to travel upwardly across the aperture of plate 16a, and since 30 slits traverse the aperture per second, the transmission of the signal and the relative movement of the slit is thus synchronized. In the event the slit is out of phase, the strip 17 may be re-adjusted by means of the screw 34.

In Fig. 2 a modification of the present invention is shown as comprising a light diffraction projector TP, a high pressure mercury lamp 80 and a condenser 81, which directs light from the lamp 80, through the slit 82a, of plate 82 (Fig. 1a); the emergent light rays are made parallel by lens 83, passing through a light diffraction cell 84, and the light in passing therethrough will be converged by lens 83a; the rest of the apparatus is similar in all respects to that shown in Fig. 1.

A transmitter 86, has a mast 87, upon which is attached a hemispherical high speed, fine definition antenna array 88, and in the distance is an airplane 89; the transmitter 86, is connected by conductors 90 to the receiver 91, and conductors 92 are connected to the mercury lamp 80; conductors 92a are connected to the wave generator WG, and continuation wires 92a, connect the generator to the quartz crystal 84a, of the cell 84, and conductors 92b are connected to a loud speaker 93.

It will be noted that in Fig. 1, conductors 28, and in Fig. 2, conductors 90, connect the respective transmitter and receiver to indicate that they receive power from the same source. It should be understood, however, that these conductors 28 and 90 may be omitted and that the respective transmitter and receiver may be remote from each other and may be connected to independent power sources.

In Fig. 3 is shown the antenna array 40, 88, comprising nine annular curved reflectors 104a—104i (Fig. 4), and arranged circumferentially in each reflector 104, there are positioned thirty-six equally spaced di-poles 105, each having electrodes 105a and 105b respectively (Figs. 4, 5). The thirty-six di-poles are so positioned that there are nine di-poles in each quadrant of the circle corresponding to the compass and within the confines of the dotted lines.

A cross-section of the antenna array 40, 88 is shown in Fig. 4, indicating the angle of transmission of the reflectors 104a—104i.

A top view of a set of di-poles is shown in Fig. 5, wherein the conductor 106a is connected directly to the electrode 105a, which is positioned at 320° of the centre line of the array and begins the northern quadrant; all of the other electrodes 105a, are then successively connected to the conductor 106a and each of the electrodes 105b are connected to separate conductors 107a.

An energy transfer unit is shown in Fig. 6 wherein a synchronous motor 110 is connected by shaft 111 to a suitable gear box 112; a shaft 113 is supported by the uprights 116, 124, and attached to this shaft is a brush carriage 114, made of insulation material, held in position by set screw 115. Fixed to the support 116 is a hollow commutator drum 117, held in position by screws 118 (one shown); the commutator drum of insulation material has nine commutator rings 119a—119i, and the carriage 114 has arranged therewith nine brushes 120a—120i, each in contact with its respective commutator ring.

Attached also to the shaft 113 is another insulation-material brush carriage 121 having nine brushes 122a—122i, and held in position by screw 115a, and each brush 122 is connected respectively to each of the brushes 120a—120i, by the wires 123a—123i. Fixed to the support 124 by screws 125, is a disc of insulation material 126 (Fig. 9) having nine circular rows 107a—107i of contacts 127, each row comprising thirty-six contacts (Fig. 9) so arranged that the brushes 122a—122i rotate against the faces of the contacts 127.

Attached to the shaft 113a are two metal discs 128, 129 having contacts 128a, 129a (Fig. 8), each disc having insulated bushings 130, 131, and positioned by the set screws 132 and 133. In contact with the metal discs 128, 129 are brushes 134, 135, which are connected to wires 136 and 137 respectively, and in turn are connected to the signal generator SG.

Two supports 138, 139 hold in position two insulation-material contact discs 140, 141, by means of screws 118, 125, each disc having nine contacts 142a—142i (Fig. 7). One of the discs 141 shows the contacts 142a—142i, which are connected to wires 143a—143i, respectively, and form the cable 144. These wires are suitably connected to the commutator rings 119a—119i, respectively, thus forming nine continuous circuits through brushes 120a—120i, wires 123a—123i and to the brushes 122a—122i.

The thirty-six wires of the group 107a are connected to respective di-pole electrodes 105b, in the top circular row (Fig. 3), and the remaining groups of wires are similarly connected to their respective groups of di-pole electrodes 105b, as shown in one such illustration in Fig. 5.

The contacts 142 of disc 140 (similar to disc 141) are connected by wires 106a—106i, which form the cable 145; these wires 106a—106i are connected to their respective electrodes 105a (Figs. 3-5) of each group of di-poles, thus completing the plurality of circuits in the transmitter system.

Fig. 7 shows the disc 141 (similar to 140) having nine equally spaced contacts 142a—142i, which are connected to conductors 143a—143i, which form the cable 144. These conductors are in turn connected to the commutator rings 119a—119i, respectively.

Fig. 8 shows one of the metal discs 128, 129, the insulation bushing 130, the raised contact 128a, and the set screw 132, which holds the disc onto the shaft 113a.

Fig. 9 shows the circular disc 126, which is made of insulation material and has nine equally spaced circular groups 107a—107i of contacts 127, each group containing thirty-six contacts, thus forming thirty-six radial sets of contacts. Each group of contacts are connected by wires (not shown) to its respective group of di-pole electrodes 105b (Figs. 3, 5), in respective reflectors 104a—104i (Figs. 1–4).

A face view of the brush carriage 121 is shown in Fig. 10. The brushes 122a—122i (Fig. 6) are graduated in size so that uniform successive contact is maintained between each succeeding radial group of contacts as the carriage rotates around the face of the disc 126 (Fig. 9), and the screw 115a holds the carriage on shaft 113.

Fig. 11 shows a viewing screen 20 which is divided into contiguous areas denoting north, east, south and west, and progressing from left to right. The surface of the screen is sectioned into nine horizontal zones and each zone is subdivided into thirty-six areas, each area being representative of an area explored or scanned by pulses from an individual di-pole 105.

The operation of the invention as disclosed in Fig. 1 is as follows: the output signal from SG is conveyed by conductors 136, 137, to the energy transfer unit (Fig. 6). The current in conductor 136 is applied by the brush 134 to the rotating disc 128 and contact 128a to the nine contacts 142a—142i, of the contact plate 140, which are connected to the wires 106a—106i, which form the cable 145; the terminals of these wires are connected to their respective electrodes 105a (as indicated in one such application shown in Fig. 5). In this manner, all the electrodes 105a of the nine groups of di-poles 105 (Fig. 3) are connected to their respective conductors 106a—106i.

The conductor 137 is connected to brush 135, which is in contact with rotating disc 129, which has contact 129a: the contact plate 141 is positioned adjacent to the disc 129, and has nine contacts 142a—142i, which in turn are connected to their respective conductors 143a—143i (Fig. 7), which form the cable 144, and these conductors are connected to their individual commutator rings 119a—119i. The nine brushes 120a—120i, in carriage 114, are in contact with their respective commutator rings 119a—119i; by means of wires 123a—123i, the brushes 122a—122i, in carriage 121, are connected with the brushes 119a to 119i, respectively.

The contacts 127, in plate 126 (Fig. 9) are individually connected in circular groups 107a—107i, which in turn are connected to the electrodes 105b (Figs. 3, 4) of the di-poles 105. In this manner, it will be seen that a plurality of groups of circuits are connected to the di-poles of the system. Each di-pole is circularly spaced 10° apart and there are nine groups of nine di-poles for each quadrant of the compass, as indicated by the symbols N, E, S, W, as shown in Fig. 3.

Each circular reflector and group of di-poles (Figs. 1–4) are so positioned that the top reflector and its group are inclined at an acute angle skywardly, and the succeeding groups and their reflectors are successively inclined downwardly and the bottom one is directed slightly below the horizon, thus almost simultaneously obtaining aerial and surface scanning; that is to say, a signal is exploratorily projected in azimuth about the vertical axis of the antenna in successive elevations, in such rapid succession (one 270th of a second for a circular sweep or a 30th of a second for a complete cycle) that the scanning of all paths in the complete sycle is almost simultaneous.

The synchronous motor 110 (Fig. 6) rotates at a speed of 1800 R. P. M. or 30 R. P. S., and the shaft 111 is connected to a gear box 112; the shaft 113 rotates clockwise at the same speed of 30 R. P. S. and the shaft 113a rotates at a reduced speed of 200 R. P. M. Fixed to these shafts are the elements heretofore described.

As the signal is generated, the pulses are conducted along conductor 137, brush 135, disc 129, contact 129a, through contact 142a, conductor 143a (Fig. 7), commutator ring 119a, brush 120a, conductor 123a, brush 122a, contact 127, conductor 107a (Fig. 5) and to the electrode 105a, of the di-pole 105.

At the same time, the circuit is completed through conductor 136, brush 134, disc 128, contact 128a, contact 142a, of disc 140, conductor 106a, not shown connected, of cable 145, and to the electrode 105b (Fig. 5).

As the motor is rotating at a speed of 1800 R. P. M., the shaft 113 is rotating the brush carriages 114 and 121 at this speed, and the shaft 113a is rotating discs 128—129 at a speed of 200 R. P. M. The signal is applied from the conductor 137, to the brush 135, disc 129, contact 129a, and in successive steps to contacts 142a—142i, which in turn conducts the pulses through the portions of the circuits as previously described.

In this manner, thirty-six pulses will be applied to the contacts of the group of wires 107a, and the next succeeding groups of thirty-six pulses will be applied to the groups of wires 107b—107i, until the cycle is completed and then resumed sequentially, 30 times per second.

The first group of pulses are applied clockwise to respective electrodes 105a, of the top row of di-poles 105 (Figs. 1–5) and the next groups of thirty-six pulses will be applied successively to each lower row of electrodes 105a, until the cycle is completed and then resumed sequentially.

A the same time, the circuit is being completed through conductor 136, brush 134, disc 128, contact 128a, contacts 142a—142i, conductors 106a—106i (forming the cable 145), and the conductor 106a is connected to all the electrodes 105a (Fig. 5) of di-poles 105. Conductor 106b is connected to all the electrodes 105a in the lower succeeding row of di-poles 105 (Fig. 3) and the conductors 106c—106i are connected to their successive respective electrodes 105a, of all the rest of the di-poles in the antenna array 40, 88.

As the brush carriage 121 makes one complete revolution around the face of the disc 126, the contacts 128a, 129a, of discs 128, 129, have made contact with contacts 142a, of the discs 140, 141, or have rotated one-ninth of a revolution; in this manner, thirty-six pulses have been applied to the di-poles 105, in reflector 104a, and the slit 26 of the band 17 is starting to move upwardly across the aperture of plate 16a, which defines the area of the viewing screen.

In this manner, the brush carriage 121 makes thirty revolutions a second, and thirty slits pass the aperture in plate 16a, thus establishing a full relationship between the projector TP, the transmitter 22 and the antenna array 40.

As the pulses are exploratorily projected omnidirectionally, this is to say progressively about the vertical axis of the antenna array 40, 88, in successive angular elevations, covering all points of the compass starting at a point 320° of the compass (Fig. 3), and radiating from an acute aerial angle (Fig. 4) to just below the horizon, at a scanning frequency of thirty times per second, the pulses impinging upon the airplane 41, are reflected and the aerial of the receiver 27 picks up the reflected or echo signals.

The reflected signal is amplified and by means of the conductors 28b, it is applied to the light shutter 15, which instantaneously permits the high frequency scanning component to pass for the duration of the reflected signal, through lens 13a, and gate 16. A portion of the scanning component will pass through the co-incidental position of the horizontal slit 26, of the moving band or shutter 17, thus obtaining what shall hereafter be referred to as the low frequency scanning component, which passes through aperture in plate 16a, lens 18, openings 19b (Fig. 1b), lens 18a, and onto the viewing screen 20.

As the first pulse is applied to each of the circular groups of di-poles in successive order, a single-pulse from the wave generator WG is applied by conductors 28a to the quartz crystal 14a of the diffraction cell 14.

Within the confines of the cell there is created a series of compressive waves in the liquid contained therein, the rate of travel being one wave traversing across the cell for each circular group of energized di-poles. The light from source 10 passing therethrough will become successively difracted into vertical striations and the resultant high frequency scanning component is blocked by the shutter 15.

When the amplified signals are applied to light shutter 15, an area or dot of light will be positioned on the screen indicating the approximate altitude of the airplane.

It will be noted that when the slit 26, of the endless band or strip 17, is synchronized with the signal emanating from the first di-pole stationed at 320° of the compass (Figs. 3, 5) in the uppermost annular reflector and the apparatus is then put in operation, pulses from the wave generator WG (Fig. 1) are applied to the piezoelectric driver 14a of the diffraction cell 14, thus creating a series of compressive waves in the liquid contained therein, the rate of travel being one wave traversing across the cell for each circular group of energized di-poles and one slit moving upwardly across the aperture in plate 16a. The light from source 10, passing through the cell will become successively diffracted into vertical striations which are referred to as the high frequency scanning component and are blocked by the shutter 15.

It will thus be perceived that when a slit 26 in the band 17 is just starting to travel upwardly across the aperture of the plate 16a, a group of 36 pulses will be applied to their respective di-poles in the top row of di-poles 105 (Figs. 1–5). As the first pulse is applied to the first di-pole of the circular group, a single pulse from the wave generator is applied by conductors 28a to the driver 14a of the diffraction cell 14, thus creating a compressive wave from the proximal end of the cell and traveling to the distal slope of the cell.

In this manner there is established a fixed synchrony between the traveling slit 26, the energizing of each group of di-poles 105 and the creating of the compressive waves in the cell 14, with its resultant light striations.

As the pulses are spinned or whirled into space about the vertical axis of the antenna in different successive elevations or paths some of the pulses upon impinging on the airplane 49 (Fig. 1) will immediately be reflected. These pulses are amplified by the receiver 27, and by means of the conductors 28b, they are applied to the light shutter 15, which permits the high frequency scanning component to pass through the various elements positioned in the optical axis of the projector and onto its relative position on the screen 20.

The light impinging upon the screen indicates the approximate location of the airplane. For this light to appear on the screen, it has been necessary for pulses to be reflected from a position $x$ (Fig. 11), to indicate the position and direction of the di-pole from which the pulses have been beamed, and of the co-incidental positions of the light striations and of the slits traveling across the aperture.

As the plane travels in a direction $y$, or to the left, pulses from a di-pole positioned ahead of the first-mentioned di-pole, will be reflected. The compressive waves in the cell 14, and the slits 26, have advanced slightly less than previously stated when the amplified pulses are applied to the shutter, and light will then be projected onto the screen in the then position of the plane.

When the plane travels in a direction $z$, or to the right, pulses from a di-pole positioned after the first-mentioned di-pole or position $x$, will be reflected. The waves and slits have advanced slightly further than previously stated when the amplified pulses have been applied to the shutter and then light will reach the screen showing the plane's new location.

The repetitious sequence of the reflected or echo signal component showing on the screen indicates the movement of the airplane 41.

At the same time, an overall coverage of the station or field is thus obtained. For oral communication, a loud speaker 29 may be suitably connected to the receiver by conductors 28c.

With reference to Fig. 2, the reflected signal is amplified, and by means of conductors 92, the amplified signal is applied directly to the mercury lamp 80, which instantaneously permits the light to pass through the various elements positioned in the optical axis, and onto the viewing screen.

It will be noted that in Fig. 1, use is made of a constant source of light and a light shutter, and in Fig. 2, the high pressure mercury lamp 80 is substituted for the light source and shutter, 10 and 15 respectively. Otherwise, the various components of the system are alike in all respects.

While the various elements have been shown and described as having a particular relative relation, it should be understood it is not intended that the claims be read with such limitation since it is obvious that these units may be re-arranged in different relative positions to accomplish the same result, without departing from the scope of the appended claims.

It will thus be seen that there are provided methods and apparatus in which the several objects of the invention are achieved and which are well adapted to meet the conditions of practical use. As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, what I claim as new and desire to secure by Letters Patent, is:

1. A signaling apparatus comprising in combination a viewing screen lined to define co-related areas representative of explored regions and a stationary antenna array having a plurality of groups of fixed directive energy-radiating means, said means in each group having their direction of radiation oriented at the same angle of elevation from the vertical axis, and said successive groups having directivity in ordinal successive angular elevations and the successive energy-radiating means in each group having their direction of radiation in ordinal successive azimuth about the axis, each individual azimuth-angle directive-radiating means corresponding to a co-related area on the viewing screen.

2. In a signaling apparatus, a signal generator, a stationary antenna array having a plurality of groups of fixed directive energy-radiating means, said means in each group having their direction of radiation oriented at the same angle of elevation from the vertical axis, and said successive groups having directivity in ordinal successive angular elevations and the successive energy-radiating means in each group having their direction of radiation in ordinal successive azimuth about the axis, energy transfer means to cyclically apply pulses from said generator to each directive-radiating means of one group separately and in succession proceeding from group to group separately and in sequence whereby same are exploratorily projected over predetermined paths for scanning regions surrounding the antenna.

3. A signaling apparatus comprising in combination a signal generator, a viewing screen lined to define co-related areas representative of explored regions and a stationary antenna array having a plurality of groups of fixed directive energy-radiating means, said means in each group having their direction of radiation oriented at the same angle of elevation from the vertical axis, and said successive groups having directivity in ordinal successive angular elevations, and the successive energy-radiating means in each group having their direction of radiation in ordinal successive azimuth about the axis, each individual azimuth-angle directive-radiating means corresponding to a co-related area on the viewing screen, energy transfer means to cyclically apply pulses from said generator to each directive-radiating means of one group separately and in succession, proceeding from group to group separately and in sequence whereby same are exploratorily projected over predetermined paths for scanning regions surrounding the antenna, a receiver to amplify echo pulses from a remote object, an electro-optical means responsive to applied signals for translating the echo pulses into light beams and means to apply the amplified pulses to said translating means and means to project the light beams in their relative positions onto the viewing screen to indicate the presence and location of the object.

4. A signaling apparatus comprising in combination a signal generator, a viewing screen lined to define co-related areas representative of explored regions, and a stationary antenna array having a plurality of groups of fixed directive energy-radiating means, said means in each group having their direction of radiation oriented at the same angle of elevation from the vertical axis, and said successive groups having directivity in ordinal successive angular elevations, the successive energy-radiating means in each group having their direction of radiation in ordinal successive azimuth about the axis, each individual azimuth-angle directive-radiating means corresponding to a co-related area on the viewing screen, energy transfer means to cyclically apply pulses from said generator to each directive-radiating means of one group separately and in succession, proceeding from group to group separately and in sequence whereby same are exploratorily projected over predetermined paths for scanning regions surrounding the antenna, a receiver to amplify echo pulses from a remote object, a light source, an electro-optical translator including a first means for scanning light from said source at high frequency in one direction of scanning, a light shutter in the path of said scanning light output responsive to applied signals to variably occlude light from said first scanning means, a second means for further scanning said light from said shutter in a direction normal to said first direction, means to apply the amplified pulses to the shutter to permit light to pass therethrough to obtain light components indicative of a remote object from which the echo pulses had been received and means to direct the light components in their relative positions onto said viewing screen to indicate the presence and location of said object.

5. A signaling apparatus comprising in combination a signal generator, a viewing screen lined to define co-related areas representative of explored regions, and a stationary antenna array having a plurality of groups of fixed directive energy-radiating means, said means in each group having their direction of radiation oriented at the same angle of elevation from the vertical axis, and said successive groups having directivity in ordinal successive angular elevations, the successive energy-radiating means in each group having their direction of radiation in ordinal successive azimuth about the axis, each individual azimuth-angle directive-radiating means corresponding to a co-related area on the viewing screen, energy transfer means to cyclically apply pulses from said generator to each directive-radiating means of one group separately and in succession, proceeding from group to group separately and in sequence whereby same are exploratorily projected over predetermined paths for scanning regions surrounding the antenna, a receiver to amplify echo pulses from a remote object, a light source, an electro-optical translator including a light shutter responsive to applied signals to occlude light from said source, means to obtain from said light source a high frequency light scanning component, means to apply the amplified pulses to the shutter to permit the high frequency light scanning component to pass therethrough, means to obtain therefrom a low frequency light scanning component which is indicative of a remote object from which the echo pulses has been received, and means to direct the resultant scanning component in its relative position onto said viewing screen to indicate the presence and location of said object.

6. In a signaling apparatus, a signal generator, a stationary antenna array having a plurality of groups of fixed directive energy-radiating means, said means in each group having their direction of radiation oriented at the same angle of elevation from the vertical axis, and said successive groups having directivity in ordinal successive angular elevations, and the successive energy-radiating means in each group having their direction of radiation in ordinal successive azimuth about the axis, each individual azimuth angle directive-radiating means corresponding to a correlated area on a viewing screen, energy-transfer means to cyclically apply pulses from said generator to each directive-radiating means of one group separately and in succession, proceeding from group to group separately and in sequence whereby same are exploratorily projected over predetermined paths for scanning regions surrounding the antenna.

JOSEPH LA VIA.

REFERENCES CITED

The following references are of record in the file of this patent:

UNITED STATES PATENTS

| Number | Name | Date |
| --- | --- | --- |
| 2,031,884 | Gray | Feb. 25, 1936 |
| 2,409,944 | Loughren | Oct. 22, 1946 |
| 2,410,666 | Leck | Nov. 5, 1946 |
| 2,426,189 | Espenschied | Aug. 26, 1947 |
| 2,426,654 | White | Sept. 2, 1947 |
| 2,432,101 | Shepherd | Dec. 9, 1947 |
| 2,412,703 | Wolff | Dec. 17, 1947 |
| 2,433,002 | Norton et al. | Dec. 23, 1947 |
| 2,466,354 | Bagnall | Apr. 5, 1949 |
| 2,510,687 | De Vore | June 6, 1950 |

FOREIGN PATENTS

| Number | Country | Date |
| --- | --- | --- |
| 818,131 | France | Sept. 18, 1937 |
| 542,634 | Great Britain | Jan. 21, 1942 |